July 15, 1958  E. M. SIRE  2,842,896
MAGNETIC TOYS
Filed July 20, 1955
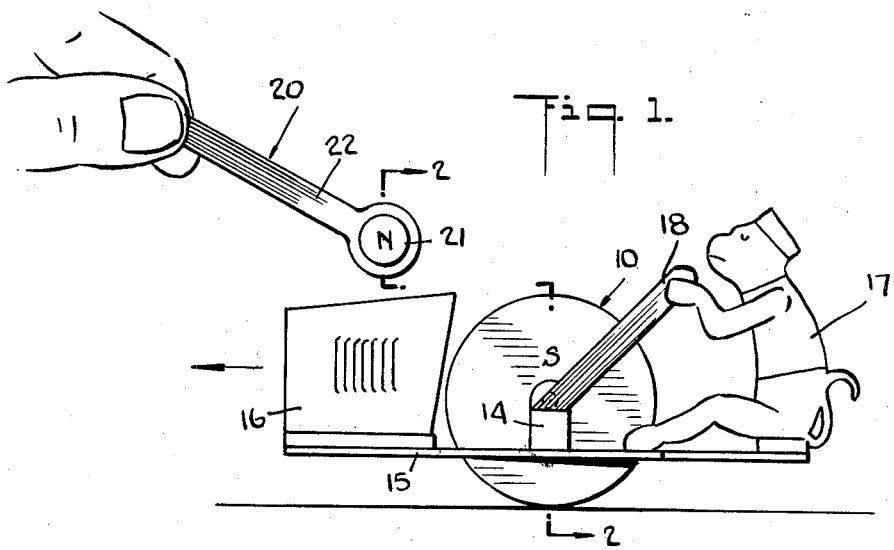
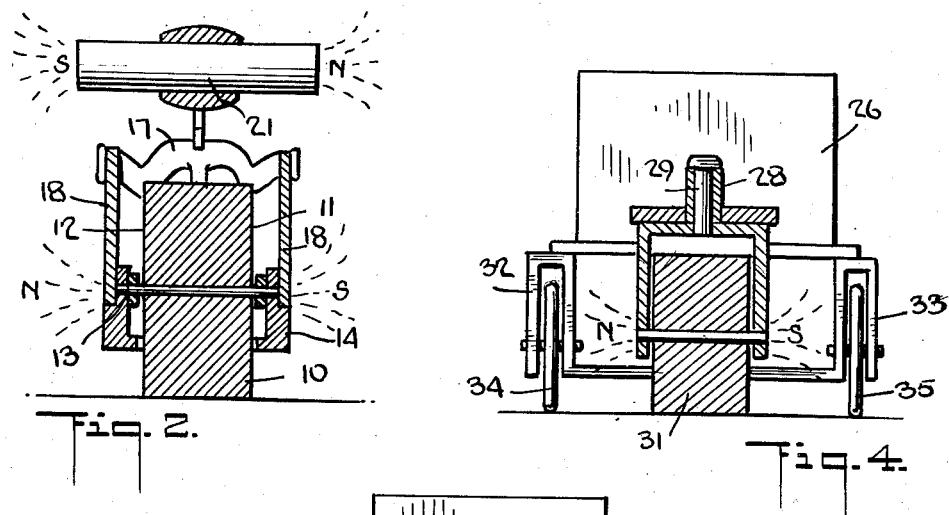
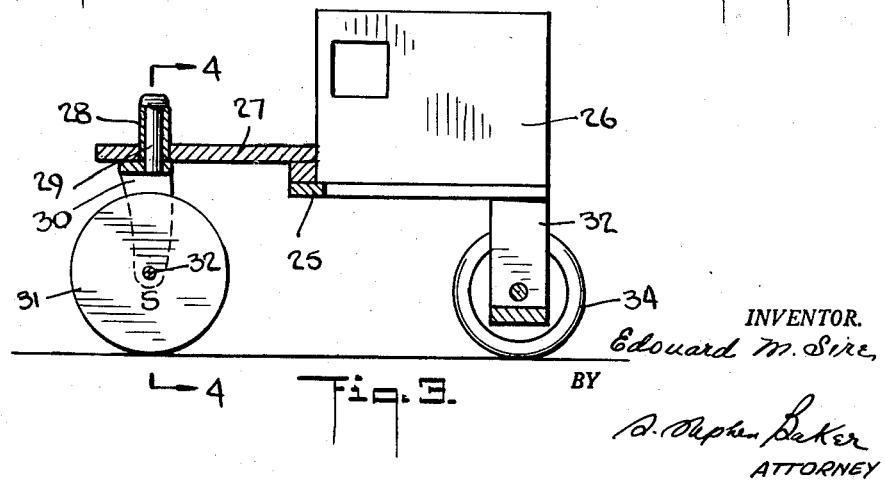
INVENTOR.
Edouard M. Sire,
BY
A. Stephen Baker
ATTORNEY

United States Patent Office 2,842,896
Patented July 15, 1958

2,842,896

MAGNETIC TOYS

Edouard M. Sire, New York, N. Y., assignor to Bar-Zim Toy Mfg. Co., Inc., Jersey City, N. J., a corporation of New Jersey Application July 20, 1955, Serial No. 523,257

3 Claims. (Cl. 46—238)

This invention relates to magnetic toys.

It is an object of the present invention to provide a magnet in the form of a disk wheel having an axle whereby the wheel can be controlled by a cooperating separate magnet held by the user. The disk wheel is embodied in a vehicle which may assume a variety of forms. In one preferred embodiment of the invention, the magnetic wheel supports a toy vhicle in a physically balanced relaionship so that only the wheel itself is used as a support and the vehicle may be easily maneuverable by the user's magnet. In another embodiment of the invention, the magnetic wheel supports a wagon, train or any other type of multi-wheeled vehicle, the wheel being steerable and serving to steer the vhicle while serving to propel it.

The invention will be further understood from the following description and drawings in which:

Figure 1 is an elevational view of a toy constructed according to the instant invention;

Figure 2 is a cross-sectional view as taken along the line 2—2 of Figure 1;

Figure 3 is a side elevational view of a modified embodiment; and

Figure 4 is a cross-sectional view as taken along the line 4—4 of Figure 3.

Referring to Figures 1 and 2, the wheel 10 comprises a magnet fabricated of any conventional material such as Alnico. Accordingly, one side 11 thereof represents the south pole while the other side 12 represents the north pole. The lines of force shown indicate the magnetic field as will be well understood. Said magnetic field is oriented substantially co-axially with the wheel axis.

The disk magnet or wheel 10 is bored centrally and transversely and an axle 13 is disposed therethrough although integral axle ends or axle recesses may be formed on the wheel. The axle 13 is rotatably journaled in the vehicle frame which includes posts 14, floor 15, a simulated engine hood 16 and a vehicle operator 17 connected to the "steering" handles 18. Of course, the operator 17 may take any desired form (illustrated here as a monkey), and substantially any representation of a vehicle and operator may be employed.

The frame of the vehicle is advantageously fabricated of some conventional plastic or other non-magentic material and one feature thereof is that the representation of the operator 17 and the hood 16 are statically balanced on either side of the axle 13, the center of gravity of the entire assembly being directly below the axle so that the floor 15 is maintained normally horizontal whereby the wheel 10 may function as the sole support for the toy.

The device is actuated by manipulating a control magnet 20 in proximity to the wheel 10. Control magnet 20 comprises a bar magnet 21 held in a plastic holder or handle 22. As indicated, the bar magnet 21 is longer than the wheel magnet 10, its poles being spaced further apart than those of the wheel to provide an external magnetic field for the control magnet of which a relatively large portion is substantially parallel to the longitudinal axis of the control magnet. This feature enhances the degree of steering control of the article.

When the user holds the control magnet 21 in front of the magnet wheel 10 and so that its north pole is juxtaposed to the south pole of the magnet 10, the wheel will be attracted by and will follow the control magnet 21. Accordingly, as the user pulls the control magnet 21 away from the vehicle in either direction, the vehicle will follow it. If the user reverses the control magnet 20 180°, the vehicle will be repelled. This offers a satisfactory "remote" control for the vehicle and the device may be utilized in a variety of fashions either as a toy vehicle by itself or as a playing piece in a game wherein the vehicle must be led along a predetermined path which may have numbers along its length. As long as the user succeeds in guiding the vehicle along the proper path, his number score may become higher and higher. If, through poor control, the vehicle should deviate from the path at any time, his number score would be correspondingly less. Of course, this is merely representative of any number of environments where the toy may be used. Obviously, it can be used simply as illustrated herein and the user may derive much enjoyment therefrom.

It has been stated above that the control magnet should be placed in front of the wheel 10 for the purpose of controlling it. It is considered preferable, however, to hold the magnet somewhat above the vertical level of the wheel 10 as shown so that as the vehicle proceeds forwardly it cannot strike the control magnet, the weight of the vehicle including the wheel being too great to be lifted by the control magnet. Furthermore, considerable variation in the action of the vehicle can be obtained by deviating from frontal juxtaposition of the control magnet as described. Thus, shifting the control magnet laterally will cause the vehicle to steer or perform other gyrations. The wheel 10 may assume other forms as shown. For example, a spherical wheel or ball or any other shape may be employed if it has a peripheral configuration which is defined by a figure of revolution about the axis of rotation of the wheel whereby it will roll along a flat surface, and means providing a magnetic field co-axial with the wheel. The axle is disposed co-axially with the magnetic field.

In the embodiment of Figures 3 and 4, a better steering vehicle is provided. The frame comprises a floor 25 upon which is supported a body 26. Body 26 may take the form of a train, a truck or any other form of conventional vehicle.

Connected to floor 25 is a platform 27 provided with an upright tube 28 serving as a bearing bushing in which is freely rotatably disposed the headed pin or shaft 29, removably connected to a yoke 30. Magnet wheel 31 is of the same type as above described. It is provided with a shaft 32 disposed in a transverse hole formed therethrough, which shaft is connected to the arm ends of the yoke whereby the magnet wheel 31 is rotatably connected to the yoke. Depending from floor 25 are a pair of wheel supports 32 and 33 rotatably enclosing wheels 34 and 35. Wheels 34 and 35 may be simple plastic or metal wheels not directly actuated except through motive power derived from magnet wheel 31.

The embodiment of Figures 3 and 4 lends itself to precise control because the wheel 31 swivels very easily in tube 28 so as to permit the vehicle to be drawn in any direction while being steered with facility by the user.

There has been shown what is now considered a preferred embodiment of the invention but it is obvious that numerous changes and omissions may be made without departing from its spirit.

What is claimed is:

1. The combination with a vehicle comprising a vehicle body and a disk wheel for propelling the body, said wheel comprising a disk magnet having a horizontal axis and having planar end faces which define the width of the magnet and are north and south poles of the magnet respectively, axle means in both of said end faces, said vehicle body being pivotally connected to said axle means, of actuating means for said vehicle, said actuating means comprising a bar magnet the respective ends of which constitute the north and south poles thereof, and a handhold member supporting said bar magnet, said bar magnet being of a length which is greater than the width of said disk magnet whereby when said bar magnet is held directly forwardly of said disk magnet with their axes parallel, the respective poles of the bar magnet will extend past both said end faces of said disk magnet for controlling magnetic actuation thereof.

2. An article according to claim 1 and wherein said vehicle body comprises a simulated operator on one side of said axle means and a simulated engine hood on the other side of said axle means and a floor supporting both said operator and said engine hood, said floor being normally horizontal and spaced above the bottom surface of said wheel.

3. The combination with a vehicle comprising a magnet in the form of a single disc wheel having a peripheral configuration which is defined by a figure of revolution about the axis of rotation of said wheel, means revolubly connecting said wheel to said vehicle for movement therewith, opposing end faces on said wheel, one of said end faces being the north pole and the other face being the south pole of the magnet respectively so as to produce a magnetic field oriented substantially coaxially with the wheel axis, whereby both tractive and directive forces may be exerted on said vehicle by means of a cooperating movable magnetic member disposed exteriorly of said vehicle and spaced from said wheel, of a control magnet for producing said tractive and directive forces, said control magnet having north and south poles which are physically spaced further apart than said end faces whereby when said control magnet is held directly forwardly of said wheel with their axes parallel, the respective poles of the control magnet extends past both said end faces of said wheel for controlling magnetic actuation thereof.

References Cited in the file of this patent
UNITED STATES PATENTS

| | | |
|---|---|---|
| 824,812 | Plimpton | July 3, 1906 |
| 1,230,847 | Bonte | June 26, 1917 |
| 1,990,793 | Matsumoto | Feb. 12, 1935 |
| 2,452,939 | LaForge | Nov. 2, 1948 |
| 2,486,273 | Gibson | Oct. 25, 1949 |
| 2,528,938 | Wolf | Nov. 7, 1950 |
| 2,624,151 | Wigal | Jan. 6, 1953 |
| 2,741,714 | Regelman | Apr. 10, 1956 |

FOREIGN PATENTS

| | | |
|---|---|---|
| 364,443 | Great Britain | Jan. 7, 1932 |
| 445,158 | Italy | Feb. 8, 1949 |